United States Patent
Rundle et al.

(10) Patent No.: US 9,146,976 B2
(45) Date of Patent: Sep. 29, 2015

(54) SYNCHRONIZATION AND RECONCILIATION THROUGH IDENTIFICATION

(71) Applicants: Bob Rundle, Albuquerque, NM (US); Niels Bax, Zuid Holland (NL)

(72) Inventors: Bob Rundle, Albuquerque, NM (US); Niels Bax, Zuid Holland (NL)

(73) Assignee: Baker Hughes Incorporated, Houston, TX (US)

( * ) Notice: Subject to any disclaimer, the term of this patent is extended or adjusted under 35 U.S.C. 154(b) by 149 days.

(21) Appl. No.: 13/898,762

(22) Filed: May 21, 2013

(65) Prior Publication Data

US 2014/0351213 A1 Nov. 27, 2014

(51) Int. Cl.
G06F 7/00 (2006.01)
G06F 17/00 (2006.01)
G06F 17/30 (2006.01)
G06F 9/44 (2006.01)

(52) U.S. Cl.
CPC .......... *G06F 17/30575* (2013.01); *G06F 8/71* (2013.01)

(58) Field of Classification Search
None
See application file for complete search history.

(56) References Cited

U.S. PATENT DOCUMENTS

| | | | |
|---|---|---|---|
| 4,558,413 A | 12/1985 | Schmidt et al. | |
| 5,983,241 A * | 11/1999 | Hoshino | 1/1 |
| 6,366,930 B1 * | 4/2002 | Parker et al. | 1/1 |
| 6,542,970 B1 * | 4/2003 | Dahlen et al. | 711/145 |
| 6,633,878 B1 * | 10/2003 | Underwood | 1/1 |
| 6,757,896 B1 * | 6/2004 | Cohen et al. | 718/100 |
| 7,047,259 B1 * | 5/2006 | Chasman et al. | 1/1 |
| 7,222,139 B2 * | 5/2007 | Mau | 707/622 |
| 7,525,484 B2 * | 4/2009 | Dupray et al. | 342/450 |
| 7,743,019 B2 * | 6/2010 | Shah et al. | 707/610 |
| 8,266,122 B1 * | 9/2012 | Newcombe et al. | 707/695 |
| 8,549,483 B1 * | 10/2013 | Bridges et al. | 717/126 |
| 2004/0103393 A1 | 5/2004 | Reddy et al. | |
| 2004/0210607 A1 * | 10/2004 | Manchanda et al. | 707/203 |
| 2004/0267714 A1 * | 12/2004 | Frid et al. | 707/3 |
| 2006/0136513 A1 * | 6/2006 | Ngo et al. | 707/203 |
| 2006/0168558 A1 | 7/2006 | de Seabra e Melo et al. | |
| 2008/0120129 A1 * | 5/2008 | Seubert et al. | 705/1 |
| 2009/0043867 A1 * | 2/2009 | Sharp et al. | 709/218 |
| 2009/0083314 A1 * | 3/2009 | Maim | 707/103 R |
| 2011/0153052 A1 * | 6/2011 | Pettibone et al. | 700/98 |
| 2011/0320411 A1 * | 12/2011 | Henderson | 707/687 |
| 2012/0303578 A1 * | 11/2012 | Calder et al. | 707/615 |
| 2013/0173546 A1 * | 7/2013 | Cline et al. | 707/638 |
| 2013/0297517 A1 * | 11/2013 | Sinha | 705/301 |

OTHER PUBLICATIONS

Decouchant et al., "A Synchronization Mechanism for an Object Oriented Distributed System", IEEE, 1991, pp. 152-159.
Extended European Search Report for EP Application No. 14169146.9-1954, dated Sep. 9, 2014, pp. 1-7.

* cited by examiner

*Primary Examiner* — Hexing Liu
(74) *Attorney, Agent, or Firm* — Cantor Colburn LLP

(57) ABSTRACT

A system and method to synchronize and reconcile objects are described. The system includes a memory device storing a first baseline including a set of first objects associated with a respective set of first identifiers and a second baseline including a set of second objects associated with a respective set of second identifiers. The system also includes a processor configured to determine a kinship among the set of first objects and the set of second objects based on the set of first identifiers and the set of second identifiers and to create a new baseline based on reconciling any conflict identified by the kinship.

14 Claims, 6 Drawing Sheets

| | Comparison | Kinship | Description |
|---|---|---|---|
| 310-1 → | Object 210a has same Oid 230 and Vid 240 as object 210b | Identical | Object 210a is identical to object 210b. |
| 310-2 → | Object 210m has different Oid 230 than object 210n | Unrelated | Object 210m has no common history with object 210n. |
| 310-3 → | Object 210x has same Oid 230 as object 210y, and Vid 240 of object 201x appears in the VidList 250 of object 210y | Ancestor | Object 210x is an ancestor of object 210y. That is, object 210y was derived from object 210x over one or more versions. |
| 310-4 → | Object 210s has same Oid 230 as object 210t, and Vid 240 of object 210t appears in the VidList 250 of object 210s | Descendant | Object 210s is a descendent of object 210t. That is object 210s was derived from object 210t over one or more versions. |
| 310-5 → | Object 210g and object 210h have the same Oid 230, but the Vid 240 of object 210g does not appear in the VidList 250 of object 210h, and the Vid 240 of object 210h does not appear in the VidList 250 of object 210g | Cousin | Objects 210g and 210h have a common ancestor. When the VidLists 250 of these objects 210g, 210h are compared, the last matching Vid 240 represents the Vid 240 of the common ancestor. |

310 / 320 / 330

| Comparison | Kinship | Description |
|---|---|---|
| 310-1 → Object 210a has same Oid 230 and Vid 240 as object 210b | Identical | Object 210a is identical to object 210b. |
| 310-2 → Object 210m has different Oid 230 than object 210n | Unrelated | Object 210m has no common history with object 210n. |
| 310-3 → Object 210x has same Oid 230 as object 210y, and Vid 240 of object 201x appears in the VidList 250 of object 210y | Ancestor | Object 210x is an ancestor of object 210y. That is, object 210y was derived from object 210x over one or more versions. |
| 310-4 → Object 210s has same Oid 230 as object 210t, and Vid 240 of object 210t appears in the VidList 250 of object 210s | Descendant | Object 210s is a descendent of object 210t. That is object 210s was derived from object 210t over one or more versions. |
| 310-5 → Object 210g and object 210h have the same Oid 230, but the Vid 240 of object 210g does not appear in the VidList 250 of object 210h, and the Vid 240 of object 210h does not appear in the VidList 250 of object 210g | Cousin | Objects 210g and 210h have a common ancestor. When the VidLists 250 of these objects 210g, 210h are compared, the last matching Vid 240 represents the Vid 240 of the common ancestor. |

FIG. 3

| Kinship | New Baseline Contains | Comment |
|---|---|---|
| Identical | A reference to one of the objects | Since the domain objects are identical it doesn't matter which object in which baseline is selected. |
| Unrelated | A reference to each respective object | |
| Ancestor/Descendant | A reference to the descendant object | The descendant object contains the latest modifications to the object. |
| Cousin | One of the objects may be selected. Alternatively, a new version may be created of one of the objects to contain the differences from the other object. | In practice this selection or version creation may involve user interaction. |

FIG. 4

Baseline 1 — 501, 230, 240 ← 510a

| Name | Address | Phone | VersionNo | Oid | Vid |
|---|---|---|---|---|---|
| Alice | Houston | +1 713-123-4567 | 1 | O1 | V1.1 |
| Bob | Albuquerque |  | 1 | O2 | V2.1 |
| Niels | Delft | +31 651 234567 | 1 | O3 | V3.1 |

Baseline 1.1 ← 510b

| Name | Address | Phone | VersionNo | Oid | Vid |
|---|---|---|---|---|---|
| *Alice* | *Albuquerque* | +1 713-123-4567 | 2 | O1 | V1.2 |
| Bob | Albuquerque |  | 1 | O2 | V2.1 |
| Niels | Delft | +31 651 555555 | 2 | O3 | V3.2 |
| *Carol* | *Delft* | +31 651 234567 | 1 | O4 | V4.1 |

520a-1 / 520c / 520b

Baseline 1.2 ← 510c

| Name | Address | Phone | VersionNo | Oid | Vid |
|---|---|---|---|---|---|
| *Alice* | *Albuquerque* | +1 505-555-5555 | 2 | O1 | V1.3 |
| Bob | Albuquerque | +1505-555-5555 | 2 | O2 | V2.2 |
| Niels | Delft | +31 651 234567 | 1 | O3 | V3.1 |

530a / 530b

Baseline 2 ← 510d

| Name | Address | Phone | VersionNo | Oid | Vid |
|---|---|---|---|---|---|
| Alice | *Albuquerque* | +1 505-555-5555 or +1 713-123-4567 | 3 | O1 | V1.4 |
| Bob | Albuquerque | +1505-555-5555 | 2 | O2 | V2.2 |
| Niels | Delft | +31 651 555555 | 2 | O3 | V3.2 |
| *Carol* | *Delft* | +31 651 234567 | 1 | O4 | V4.1 |

SYNCHRONIZATION AND RECONCILIATION THROUGH IDENTIFICATION

BACKGROUND

Synchronization and reconciliation of multiple versions is a necessary process in many contexts. For example, object-oriented programming involves the interaction among a plurality of objects to implement a computer application. Each object includes data fields and associated procedures (methods). Distributed objects are spread over multiple computers or multiple processors within a computer. Different objects may be managed by different users on different systems. For example, an object may be edited by one user to create a new object while the object is modified by another user. More than one editor may modify the same object. Ultimately, synchronization and reconciliation are needed to clarify the hierarchy and most recent version that should be used when the objects interact with each other.

One of the current approaches to managing multi-version environments is by maintaining a single-version-of-truth. In a distributed object system, for example, this involves a single server managing all the objects and permitting only one client to work with the same object at a time. Changes made and committed at the client are reflected in the version maintained by the server. An object check-out and check-in process may be used to implement the single-version-of-truth approach.

SUMMARY

According to an aspect of the invention, a system to synchronize and reconcile objects includes a memory device storing a first baseline including a set of first objects associated with a respective set of first identifiers and a second baseline including a set of second objects associated with a respective set of second identifiers; and a processor configured to determine a kinship among the set of first objects and the set of second objects based on the set of first identifiers and the set of second identifiers and to create a new baseline based on reconciling any conflict identified by the kinship.

According to another aspect of the invention, a method of synchronizing and reconciling objects includes storing, in a memory device, a first baseline including a set of first objects associated with a respective set of first identifiers and a second baseline including a set of second objects associated with a respective set of second identifiers; determining, using a processor, a kinship among the set of first objects and the set of second objects based on the set of first identifiers and the set of second identifiers; and creating, using the processor, a new baseline based on reconciling any conflict identified by the kinship.

According to yet another aspect of the invention, a non-transitory computer readable storage medium stores instructions which, when processed by a processor, cause the processor to implement a method of synchronizing and reconciling objects. The method includes storing a first baseline including a set of first objects associated with a respective set of first identifiers and a second baseline including a set of second objects associated with a respective set of second identifiers; determining a kinship among the set of first objects and the set of second objects based on the set of first identifiers and the set of second identifiers; and creating a new baseline based on reconciling any conflict identified by the kinship.

BRIEF DESCRIPTION OF THE DRAWINGS

Referring now to the drawings wherein like elements are numbered alike in the several Figures:

FIG. 3 illustrates a correspondence that may be stored in the memory device of one or more processing devices;

FIG. 4 outlines a process of reconciliation implemented by a processor of one or more processing devices;

FIG. 5 illustrates an example of merging baselines according to an embodiment of the invention.

DETAILED DESCRIPTION

As noted above, synchronization and reconciliation are necessary in a multi-version environment. The single-version-of-truth approach to maintaining synchronization limits all clients and users to keeping in contact with the server and making edits in turn. Embodiments of the system and method described herein facilitate synchronization and reconciliation through identification of objects. As a result, the objects may be edited, simultaneously or in turn, by clients and users that are not in contact with a single server acting as a repository for the objects. While embodiments are detailed below with specific reference to distributed objects for explanatory purposes, alternate embodiments apply, as well, to other multi-version environments.

In a distributed object system, some objects are transitory, derivative of other objects, or are otherwise of secondary importance to this discussion. Exemplary objects of interest with respect to embodiments of the invention are objects that map to real world objects, both physical and abstract, and together model the domain of interest. These objects are designated as domain objects. Exemplary domain objects in the oil and gas domain include fields, reservoirs, wells, geological grids, faults, horizons, and fluid contacts. Exemplary domain objects in the email domain include email messages and address book entries. For explanatory purposes, address book entries are discussed below.

Figure 1:
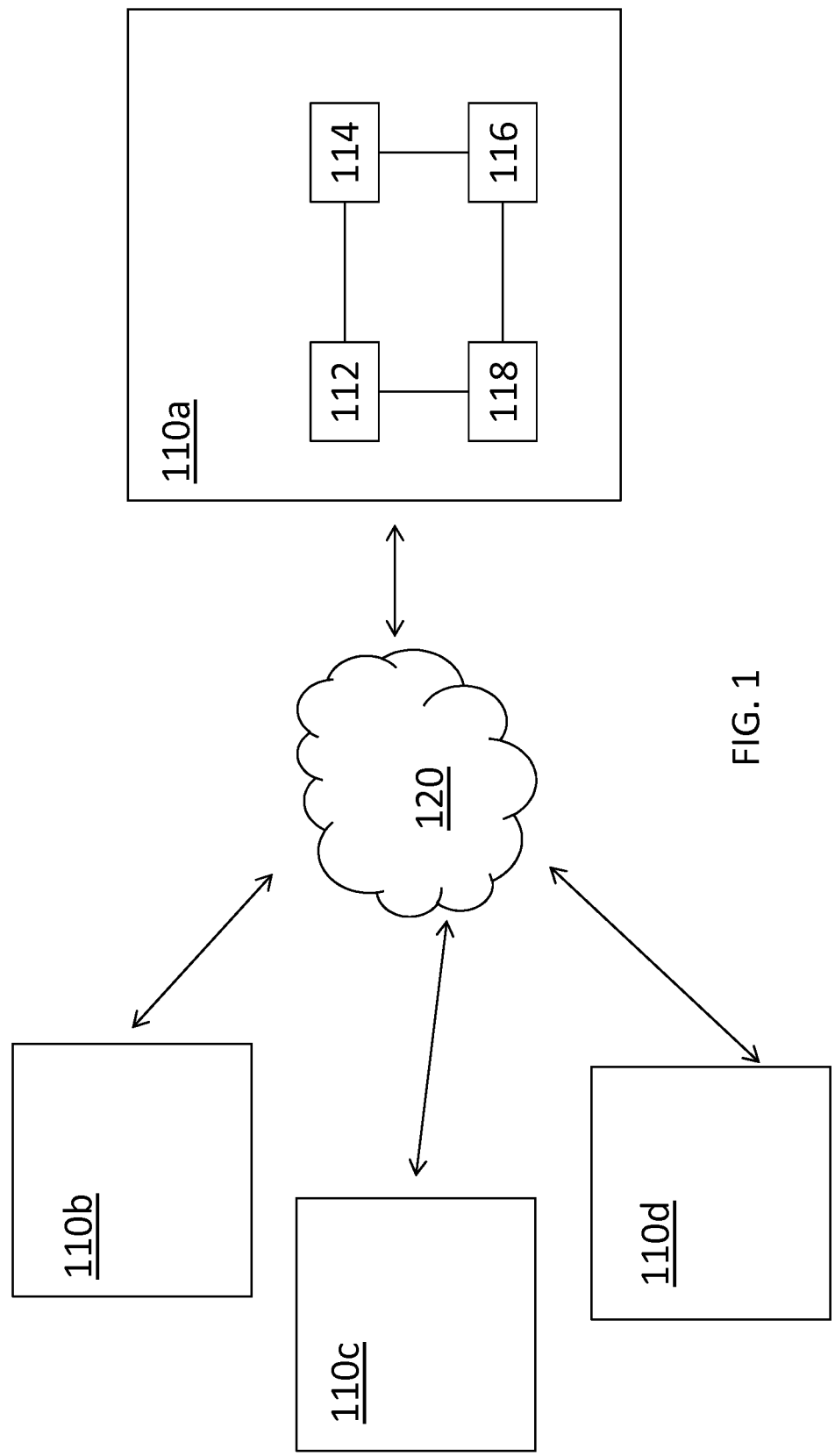
FIG. 1 is a block diagram of a distributed object system according to an embodiment of the invention.

FIG. 1 is a block diagram of a distributed object system according to an embodiment of the invention. Any number of processing devices 110 may communicate with each other over a network 120. Each processing device 110 has one or more processors 112, one or more memory devices 114, an input interface 116, and an output interface 118. Each processing device 110 may be used to edit a distributed object (object 210, FIG. 2). A baseline 510 (see e.g., FIG. 5) refers to a snapshot or reference list of (domain) objects 210 at a given time. Each user and/or processing device 110 may maintain a baseline 510, and, when a user runs the program generated with the distributed objects 210, baselines 510 must be merged and reconciled. The object identification process used according to embodiments of the invention to achieve the reconciliation is detailed below.

Figure 2:
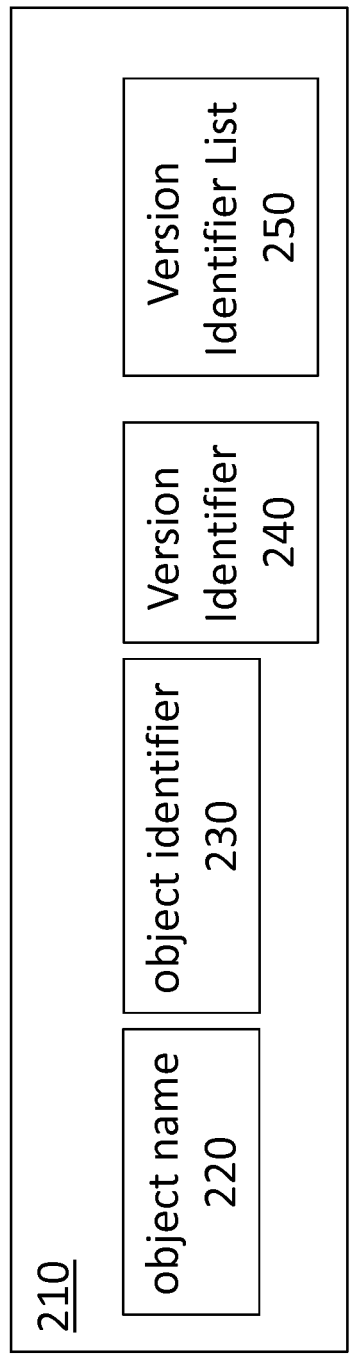
FIG. 2 illustrates the identifiers associated with an object according to embodiments of the invention.

FIG. 2 illustrates the identifiers associated with an object 210 according to embodiments of the invention. Each object 210 may be imprecisely identified by a tuple (Name, Version Number), where Name is the object name 220, which may not be unique to the particular domain object 210, and Version Number may also not be unique to the domain object 210. Each object 210 may also be precisely identified by a tuple (Oid, Vid), where Oid 230 is an object identifier and Vid 240 is a version identifier. Each of the identifiers (Oid 230 and Vid 240) is universally unique such that, regardless of which user is editing an object 210 or the processing device 110 used for the edits, unrelated objects 210 will not have the same Oid 230 and two different edits of the same Oid 230 object 210 will not have the same Vid 240. All objects 210 resulting from the same initial object 210 will have the same Oid 230. However, when one object 210 stems from another, the two objects 210 will have a different Vid 240. Thus, the tuple (Oid, Vid) is unique for each non-identical object 210. Each object 210 also maintains a list of all Vid 240 associated with that object 210 as the VidList 250. That is, an object 210a that had two previous Vid 240 associated with it may be copied and edited to create an object 210b that now has three versions (Vid 240) associated with it. The two objects 210a, 210b would have the same Oid 230 but different Vid 240, and the first two Vid 240 would be in common in their VidLists 250, while the object 210b has a third Vid 240 that the original object 201a does not have in its VidList 250. By using the Oid 230, Vid 240, and VidList 250 of any two objects, their relationship (kinship) to each other, if any, may be determined, and reconciliation to create a baseline 510 is accomplished, as detailed below.

FIG. 3 illustrates a correspondence that may be stored in the memory device 114 of one or more processing devices 110. A comparison of the Oid 230, Vid 240, and VidList 250 of two different objects 210 (shown in column 310) is used to determine their corresponding kinship (column 320), which is described in column 330. As shown in row 310-1, two objects 210a and 210b that share the same Oid 230 and Vid 240 are identical, because the tuple (Oid, Vid) is unique to a given object 210. Row 310-2 illustrates that when the Oid 230 of two objects 210m and 210n is not the same, then the two objects 210 could not have had the same origin and are unrelated. Both rows 310-3 and 310-4 illustrate ancestry. When objects 210x and 210y have the same Oid 230, and when the Vid 240 of one of the objects 210x appears in the VidList 250 of the other object 210y, then the object 210x whose Vid 240 appears in the VidList 250 of the other object 210y must be an ancestor of the other object 210y (and the other object 210y must be a descendent of the object 210x). Similarly, when objects 210s and 210t have the same Oid 230, and when the Vid 240 of one of the objects 210t appears in the VidList 250 of the other object 210s, then the object 210s with the VidList 250 in which the Vid 240 of the other object 210t appears must be a descendent of the other object 210t (and the other object 210t must be an ancestor of the object 210s). Objects 210g, 210h that originated from the same object (and thus have the same Oid 230) are illustrated in row 310-5. In this case, the objects 210g, 210h do not have an ancestor-descendent relationship (one object 210 Vid 240 does not appear in the VidList 250 of the other object 210). However, the common Vid 240 in the VidList 250 of each object 210g, 210h relates to their common ancestor and indicates the kinship of the objects 210g, 210h as cousins.

FIG. 4 outlines a process of reconciliation implemented by a processor 112 of one or more processing devices 110. Based on the kinship (column 410) identified according to the correspondence discussed with reference to FIG. 3, the contents of the new baseline (column 420) are determined as explained in column 430. As illustrated in row 410-1, when the objects 210 are found to be identical (e.g., objects 210a, 210b in row 310-1 of FIG. 3), then there is no conflict, and a reference to either (e.g., object 210a or 210b) may be used. As illustrated in row 410-2, when the objects 210 are unrelated (e.g., objects 210m and 210n in row 310-2 of FIG. 3), then there is no conflict and each object (e.g., 210m, 210n) should be referenced as it is invoked. As illustrated in row 410-3, when the objects 210 are directly related (e.g., object 210x is an ancestor of object 210y and object 210t is an ancestor of object 210s in rows 310-3 and 310-4, respectively, of FIG. 3), then the descendent object (e.g., 210y, 210s) is referenced in the baseline because it represents the latest modifications to the object 210. As illustrated in row 410-4, when objects 210 are cousins (e.g., objects 210g, 210h in row 310-5 of FIG. 3), then there is a conflict that must be reconciled. The reconciliation may be achieved through the selection of one of the cousin objects (e.g., 210g, 210h). This selection may be automatic based on pre-defined criteria in the processing device 110. In alternate embodiments, the user may be alerted to the conflict and asked to input a selection. According to another embodiment, the reconciliation may involve creating a new version of one of the objects (e.g., 210g or 210h) that includes differences that are part of the other object (e.g., 210h or 210g). This embodiment may also include user intervention to varying degrees.

FIG. 5 illustrates an example of merging baselines according to an embodiment of the invention. As noted above, exemplary domain objects 210 in the oil and gas domain include fields, reservoirs, wells, geological grids, faults, horizons, and fluid contacts. In FIG. 5, the example relates to address book entries in a mobile communication domain. In this example, each object 210 having a given Oid 230 (address book entry) has multiple elements (Name, Address, Phone). Baseline 1 510a represents an initial state of the system that may have been stored in a repository and copied by one or more users onto two different mobile devices. Baseline 1.1 510b represents edits to baseline 1 510a in one of the mobile devices, and baseline 1.2 510c represents edits to baseline 1 510a in the other of the mobile devices. The edits done to create baseline 1.1 510b and baseline 1.2 510c were done when the mobile devices were not in contact with the repository (from which baseline 1 510a was initially copied). When the mobile devices restore connectivity to the repository, the reconciliation or merge of baseline 1.1 510b and baseline 1.2 510c is reflected in baseline 2 510d. Specifically, in baseline 1.1 510b, an address is changed (520a-1), resulting in an update to the corresponding version number (VersionNo) 501 to 2 and Vid 240 for Oid 230 O1 of V1.2. A phone number is changed (520b) for Oid 230 O3, resulting in an updated VersionNo 501 of 2 and Vid 240 of V3.2. A new entry with Oid 230 "O4" is added (520c) with an initial VersionNo 501 of 1 and Vid 240 of V4.1. In baseline 1.2 510c, an address change (520a-2) is made that happens to be the same as the address change (520a-1) made in baseline 1.1 510b. In addition, a phone number (530a) change is also made for Oid 230 O1 to result in an updated VersionNo 501 of 2 and Vid 240 of V1.3. A phone number (530b) is added (where there was no number before) for Oid 230 O2 to result in an updated VersionNo 501 of 2 and Vid 240 of V2.2. The new entry (520c) with Oid 230 O4 is not part of the baseline 1.2 510c but only part of the baseline 1.1 510b and has VersionNo 501 of 1 and Vid 240 V4.1. Baseline 2 510d, resulting from a merge of baseline 1.1 510b and baseline 1.2 510c, results from the process described with reference to FIGS. 3 and 4, as discussed below.

Both baseline 1.1 510b and baseline 1.2 510c include Oids 230 O1, O2, and O3. With respect to Oid 230 O1, both baseline 1.1 510b and baseline 1.2 510c have the same Oid 230 O1 but different Vid 240. Because neither baseline 1.1 510b nor baseline 1.2 510c stemmed from the other (none of the elements of one of those baselines is a descendant or ancestor of elements of the other baseline), the elements of Oid 230 O1 in baseline 1.1 510b and baseline 1.2 510c are cousins (see 310-5 of FIG. 3). With respect to the address element, the cousins (changes 520a-1 and 520a-2) are identical. Thus, the reconciliation for the address element of Oid 230 O1 is trivial, and the new address (520a-1 and 520a-2) is incorporated into baseline 2 510d. The phone number element change (530a) is only in baseline 1.2 510c (not in baseline 1.1 510b), so, with respect to the "Phone" element of Oid 230 O1, the conflict between the two entries must be reconciled. As discussed above, one of the ways to reconcile a conflict is to create a new version 540 that incorporates the differences between baseline 1.1 510b and baseline 1.2 510c. With regard to Oid 230 O2, both baseline 1.1 510b and baseline 1.2 510c have the same Oid 230 O2 but the Vid 240 in baseline 1.1 510b is V2.1 while the Vid 240 in baseline 1.2 510c is V2.2. Thus, for Oid 230 O2, the phone number element in baseline 1.1 510b is an ancestor of the phone number element in baseline 1.2 510c. Accordingly, the more recent version (V2.2 in baseline 1.2 510c) is used and the phone number 530b added in baseline 1.2 510c is included in Oid 230 O2 of baseline 2 510d. With regard to Oid 230 O3, both baseline 1.1 510b and baseline 1.2 510c have the same Oid 230 O3 but the Vid 240 in baseline 1.1 510b is V3.2 while the Vid 240 in baseline 1.2 510c is V3.1. Thus, for Oid 230 O3, the phone number element in baseline 1.2 510c is an ancestor of the phone number element in baseline 1.1 510b. Accordingly, the more recent version (V3.2 in baseline 1.1 510b) is used and the phone number 520b from baseline 1.1 510b is used in baseline 2 510d. Finally, with regard to the new entry 520c included as Oid 230 O4 in baseline 1.1 510b, there is no Oid 230 O4 in baseline 1.2 510c. Thus, the entry (Oid 230 O4) is included in baseline 2 510d because it is unrelated to (and, therefore, does not conflict with) any entry in baseline 1.2 510c.

Figure 6:
FIG. 6 is a process flow of a method of merging baselines of objects according to embodiments of the invention.

FIG. 6 is a process flow of a method of merging baselines of objects 210 according to embodiments of the invention. At block 610, obtaining identifiers associated with each object 210 includes obtaining the Oid 230, Vid 240, and VidList 250. At block 620, using the identifiers to determine kinship among objects is done by a processor 112 of a processing device 110 according to the process described with reference to FIGS. 3 and 4. At block 630, reconciling as needed includes determining when two objects 210 are cousins and, therefore, in conflict. As noted above, several different approaches, with and without user intervention, may be used to resolve the conflict. Creating a new baseline at block 640 includes creating a snapshot of the objects 210 with any conflicts reconciled as illustrated by the example discussed with reference to FIG. 5.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A system to synchronize and reconcile objects, the system comprising:
a memory device storing a first baseline including a set of first objects associated with a respective set of first identifiers and a second baseline including a set of second objects associated with a respective set of second identifiers;
  wherein the set of first identifiers for each of the set of first objects includes a first object identifier, a first version identifier, and a first version list and the set of second identifiers for each of the set of second objects includes a second object identifier, a second version identifier, and a second version list;
  wherein the first version list identifies previous first version identifiers for each respective first object of the set of first objects and the second version list identifies previous second version identifiers for each respective second object of the set of second objects; and
a processor configured to determine a kinship among the set of first objects and the set of second objects based on the set of first identifiers and the set of second identifiers and to create a new baseline based on reconciling any conflict identified by the kinship.

2. The system according to claim 1, further comprising an input interface to receive the first baseline or the second baseline.

3. The system according to claim 1, wherein when a first object among the set of first objects has a first object identifier and a first version identifier that are identical to a second object identifier and a second version identifier of a second object among the set of second objects, the processor determines that the first object and the second object are identical and creates the new baseline with a reference to either the first object or the second object.

4. The system according to claim 1, wherein when a first object among the set of first objects has a different first object identifier than a second object identifier of a second object among the set of second objects, the processor determines that the first object and the second object are unrelated and creates the new baseline with a separate reference to each of the first object and the second object.

5. The system according to claim 1, wherein when a first object among the set of first objects has a first object identifier that is identical to a second object identifier of a second object among the set of second objects and a first version identifier that is listed among a second version list of the second object, the processor determines that the first object is an ancestor of the second object and creates the new baseline with a reference to the second object rather than the first object.

6. The system according to claim 1, wherein when a first object among the set of first objects has a first object identifier that is identical to a second object identifier of a second object among the set of second objects and a first version list that lists the second version identifier of the second object, the processor determines that the first object is a descendent of the second object and creates the new baseline with a reference to the first object rather than the second object.

7. A method of synchronizing and reconciling objects, the method comprising:
storing, in a memory device, a first baseline including a set of first objects associated with a respective set of first identifiers and a second baseline including a set of second objects associated with a respective set of second identifiers;
  wherein the storing the first identifiers includes storing a first object identifier, a first version identifier, and a first version list for each of the set of first objects, and the storing the second identifiers includes storing a second object identifier, a second version identifier, and a second version list for each of the set of second objects;
  wherein the storing the first version list includes storing previous first version identifiers for each respective first object of the set of first objects, and the storing the second version list includes storing previous second version identifiers for each respective second object of the set of second objects;
determining, using a processor, a kinship among the set of first objects and the set of second objects based on the set of first identifiers and the set of second identifiers; and
creating, using the processor, a new baseline based on reconciling any conflict identified by the kinship.

8. The method according to claim 7, further comprising receiving the first baseline or the second baseline over a network.

9. The method according to claim 7, wherein when a first object among the set of first objects has a first object identifier and a first version identifier that are identical to a second object identifier and a second version identifier of a second object among the set of second objects, the determining the kinship includes the processor determining that the first object and the second object are identical and creating the new baseline includes referencing either the first object or the second object.

10. The method according to claim 7, wherein when a first object among the set of first objects has a different first object identifier than a second object identifier of a second object among the set of second objects, the determining the kinship includes the processor determining that the first object and the second object are unrelated and creating the new baseline includes referencing each of the first object and the second object separately.

11. The method according to claim 7, wherein when a first object among the set of first objects has a first object identifier that is identical to a second object identifier of a second object among the set of second objects and a first version identifier that is listed among a second version list of the second object, the determining the kinship includes the processor determining that the first object is an ancestor of the second object and creating the new baseline includes referencing the second object rather than the first object.

12. The method according to claim 7, wherein when a first object among the set of first objects has a first object identifier that is identical to a second object identifier of a second object among the set of second objects and a first version list that lists the second version identifier of the second object, the determining the kinship includes the processor determining that the first object is a descendent of the second object and creating the new baseline including referencing the first object rather than the second object.

13. A non-transitory computer-readable storage medium storing instructions which, when processed by a processor, cause the processor to implement a method of synchronizing and reconciling objects, the method comprising:
   storing a first baseline including a set of first objects associated with a respective set of first identifiers and a second baseline including a set of second objects associated with a respective set of second identifiers;
      wherein the storing the first identifiers includes storing a first object identifier, a first version identifier, and a first version list for each of the set of first objects, and the storing the second identifiers includes storing a second object identifier, a second version identifier, and a second version list for each of the set of second objects;
      wherein the storing the first version list includes storing previous first version identifiers for each respective first object of the set of first objects, and the storing the second version list includes storing previous second version identifiers for each respective second object of the set of second objects; and
   determining a kinship among the set of first objects and the set of second objects based on the set of first identifiers and the set of second identifiers; and creating a new baseline based on reconciling any conflict identified by the kinship.

14. The method according to claim 13, further comprising receiving the first baseline or the second baseline over a network.

* * * * *